United States Patent
Jacob et al.

(10) Patent No.: US 8,538,098 B2
(45) Date of Patent: Sep. 17, 2013

(54) IMAGE PROCESSING METHOD FOR DISPLAYING INFORMATION RELATING TO PARIETAL MOTIONS OF A DEFORMABLE 3-D OBJECT

(75) Inventors: Marie Jacob, Paris (FR); Olivier Gerard, Viroflay (FR); Antoine Collet-Billon, Paris (FR)

(73) Assignee: Koninklijke Philips N.V., Eindhoven (NL)

( * ) Notice: Subject to any disclaimer, the term of this patent is extended or adjusted under 35 U.S.C. 154(b) by 2443 days.

(21) Appl. No.: 10/518,845

(22) PCT Filed: Jun. 24, 2003

(86) PCT No.: PCT/IB03/02643
§ 371 (c)(1),
(2), (4) Date: Dec. 21, 2004

(87) PCT Pub. No.: WO2004/003851
PCT Pub. Date: Jan. 8, 2004

(65) Prior Publication Data
US 2006/0045328 A1    Mar. 2, 2006

(30) Foreign Application Priority Data
Jun. 28, 2002 (EP) .................................... 02291622

(51) Int. Cl.
*G06K 9/00* (2006.01)
(52) U.S. Cl.
USPC ........................... 382/128; 382/154; 382/100
(58) Field of Classification Search
USPC ......................................... 382/100, 128, 154
See application file for complete search history.

(56) References Cited

U.S. PATENT DOCUMENTS 5,803,914 A * 9/1998 Ryals et al. .................... 600/407
6,295,464 B1 * 9/2001 Metaxas ....................... 600/407

(Continued)

OTHER PUBLICATIONS

"Standardized Myocardial Segmentation and Nomenclature for Tomographic Imaging of the heart" by the American Heart Writing Group on Myocardial Segmentation and Registration for Cardiac Imaging: Manuel D. Cerqueira, et al, Standardized Myocardial Segmentation and Nomenclature for Tomographic Imaging of the Heart, Circulation 2002; 105:539-542, whose circulation is available at http://www.circulationaha.org.

(Continued)

*Primary Examiner* — Edward Park

(57) ABSTRACT

Image processing system for displaying information relating to the amplitude of displacements of wall regions of a deformable 3-D object under study, comprising acquisition means to acquire an image sequence of the simplified 3D object wall; and processing means to process the image data for defining region(s) of interest on the simplified 3D object wall, and computing the maximal amplitudes of displacement of said region(s) of interest over a period of time; constructing two 2D simplified representations (bull's eye representations) of the 3D simplified object wall with projection of the region(s) of interest in respective segments of said 2D simplified representations, respectively denoted by 2D simplified amplitude and phase representations; and further comprising display means to display color coded indications of the maximal amplitudes of displacements of the region(s) of interest over a period of time in the respective segments of the 2D simplified amplitude representation; and the display of color coded indications of the instants of time at which the maximum of amplitudes of displacements occur(s) in the region(s) of interest, over said period of time, in the respective segments of the 2D simplified phase representation. The 2D simplified amplitude and phase representations are preferably displayed together in a same image. The object under study can be the heart left ventricle. The image sequence can be provided and processed by an ultrasound system.

20 Claims, 4 Drawing Sheets

(56) References Cited

U.S. PATENT DOCUMENTS 6,879,711 B2 * 4/2005 Maurincomme et al. ..... 382/128
2003/0006984 A1 1/2003 Collet-Billon et al.

OTHER PUBLICATIONS

Gerhard Graf, et al: Reconstruction of Fourier Coefficients: A Fast Method to Get Polar Amplitude and Phase Images of Gated SPECT, vol. 31, No. 11, Nov. 1990, pp. 1856-1861.

H. Delingette: Simplex Meshes: A General Representation for 3D Shape Reconstruction: CVPR 1994, Jun. 1994, IEEE pp. 856-859. Seattle, USA.

O. Gerard, et al: Automatic Analysis of the Left Ventricle in the Time Sequences of 3-D Echo-Cardiographic Images, MICCAI 2001, pp. 1224-1225.

Manuel D. Cerqueira, et al: Standardized Myocardial Segmentation and Nomenclature for Tomographic Imaging of the Heart, Circulation 2002, pp. 105, 539-542.

* cited by examiner

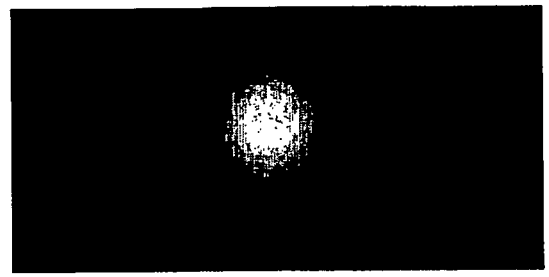
FIG.1A
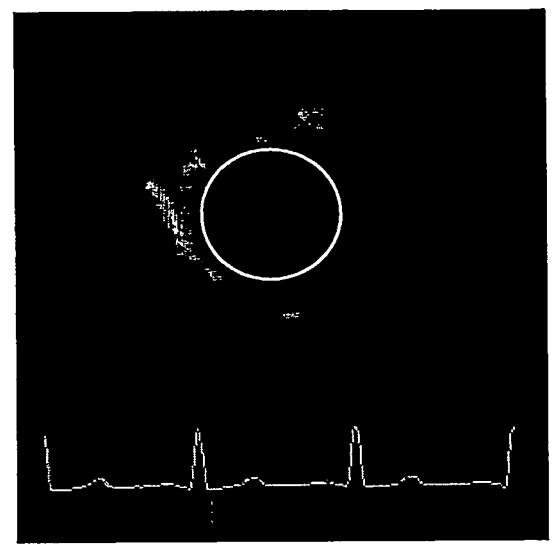
FIG.1B
FIG.1C
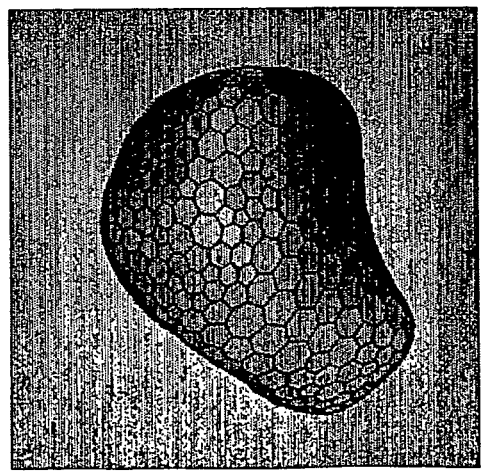
FIG.1D

IMAGE PROCESSING METHOD FOR DISPLAYING INFORMATION RELATING TO PARIETAL MOTIONS OF A DEFORMABLE 3-D OBJECT

The invention relates to an image processing system for displaying information relating to parietal motions of a deformable 3-D object under study. In particular, the invention relates to an image processing system for displaying information relating to body organ wall motions, for example the heart, that occur during an image sequence, together with indications of the instant of the sequence at which said motions occur. The invention particularly finds applications in the field of medical examination apparatus, for processing and displaying processed medical images using processing systems connected to viewing systems.

In order to optimize and facilitate communication between cardiac imaging modalities for research and clinical application, the American Heart Association (AHA) makes consensus recommendations for the following: orientation of the heart, names of the cardiac planes, number of myocardial segments, selection and thickness of cardiac slices for display and analysis, nomenclature and location of segments, and assignment of segments to coronary arterial territories. These recommendations are applicable for imaging heart wall motion as exposed in the publication entitled "Standardized Myocardial Segmentation and Nomenclature for Tomographic Imaging of the heart" by the American Heart Writing Group on Myocardial Segmentation and Registration for Cardiac Imaging: Manuel D. Cerqueira, et alii, *Standardized Myocardial Segmentation and Nomenclature for Tomographic Imaging of the Heart*, Circulation 2002; 105:539-542, whose circulation is available at "http://www.circulationaha.org". According to these recommendations, the heart imaging modalities should define, orient and display the heart using the long axis of the left ventricle and selected planes oriented at 90° angles relative to the long axis. The names of the 90°-oriented cardiac planes used in all modalities should be short axis, vertical long axis and horizontal long axis. The heart should be divided into 17 segments for assessment of the myocardium and the left ventricle. The heart should further be divided into equal thirds perpendicular to the long axis. In the publication in reference, the heart is represented in FIG. 4 using a bull's eye technique. Using this technique, the 17 predefined segments are projected along the long vertical axis, in a circle. The apex forms a small central circle numbered 17, the other segments are represented on three concentric zones, which are divided into sectors, each being attributed a number corresponding to one segment of the heart. According to the AHA recommendations, the names of the myocardial segments should define the location relative to the long axis of the heart and the circumferential location.

It is an object of the present invention to propose an image processing system for processing an image sequence of a deformable object of interest and for displaying information relating to the amplitude values of motions of predefined regions of said object in a coded manner, together with an indication of the instant of the image sequence at which a given amplitude value is reached in a given predefined region.

According to the invention, this system has processing means to perform the following operations. The motions of the walls of the 3-D object of interest are registered in a sequence of 3-D images, wherein each 3-D image corresponds to a given instant. An analysis of the motions of predetermined regions during the sequence permits of calculating the amplitudes of motions of the regions for each image of the sequence. The different regions may be color-coded in function of their amplitude of motion so that, while looking at the unrolling of the sequence, the physician may see the evolution of the amplitudes of motions of the regions in function of time. However, a problem is that such a presentation of the results of this analysis is difficult to understand and to use by the physician, because the variations of the amplitudes of motions of the regions are too numerous and too rapid during the unrolling of the sequence.

Hence, it is an object of the invention to propose a system wherein these results are further processed and presented in only one displayed image, wherein the organ is shown in a schematic representation of specific values of the amplitudes of motion of the regions: for example the maximal values or the minimal values. According to the invention, this system has means to propose another similar schematic representation shown in the same displayed image, in order to allow the detection of the instant at which said specific value of amplitude is reached in a given region. Preferably both schematic representations are color-coded. The construction of such a display image permits of transforming the study of the complex and numerous results of the object motion analysis into precise, compact and complete representations, easy to interpret and to use by the physician.

To this end, the invention proposes an image processing system as claimed in claim 1. It is a particular object of the invention to apply this system to cardiac ventricle wall motion display and especially to the left ventricle wall motion display. In this case, the walls of the heart are divided into segments, which are disposed and numbered as recommended by the AHA in a bull's eye representation. So, it is also an object of the present invention to propose an image processing system for displaying, in an image, a first 2-D schematic representation of predefined regions of the heart, each region showing an indication of the maximum amplitude values of dilation or contraction in a coded manner, together with a second similar 2-D schematic representation of the same predefined regions of the heart showing an indication of the instant at which said maximum amplitude value is reached in a given region in a coded manner. It is a particular object of the invention to provide this information in bull's eye representations such as the one recommended by the AHA. The segment motions are attributed a color according to a code of colors in order to permit of quantifying each segment displacement. This provides, in only one image, the values of amplitude of motion of each segment given in the first schematic representation, preferably a bull's eye representation. However, there still remains the problem that one such bull's eye representation only indicates given amplitude of motion for each segment without indication of the instant when said amplitude of motion is reached. Thus, according to the invention, the second similar schematic representation, preferably a second similar bull's eye, in relation with the first bull's eye representation, indicates in a color coded form, at which instant of the sequence said amplitude of motion is reached in a given segment.

The invention also relates to an ultrasound medical examination apparatus having such a system with image processing means, to a method having steps for operating the system and to a program product having instructions for carrying out the method.

The invention is described hereafter in detail in reference to the following diagrammatic drawings, wherein:

FIG. 1A represents a spherical deformable Mesh Model for segmenting the walls of the heart left ventricle using the Simplex Mesh technique; FIG. 1B represents an ultrasound image of the heart left ventricle, with a trace of the spherical deformable Mesh Model positioned in the left ventricle cavity; FIG. 1C represents the associated ECG; and FIG. 1D represents the segmented left ventricle;

Figure 2:
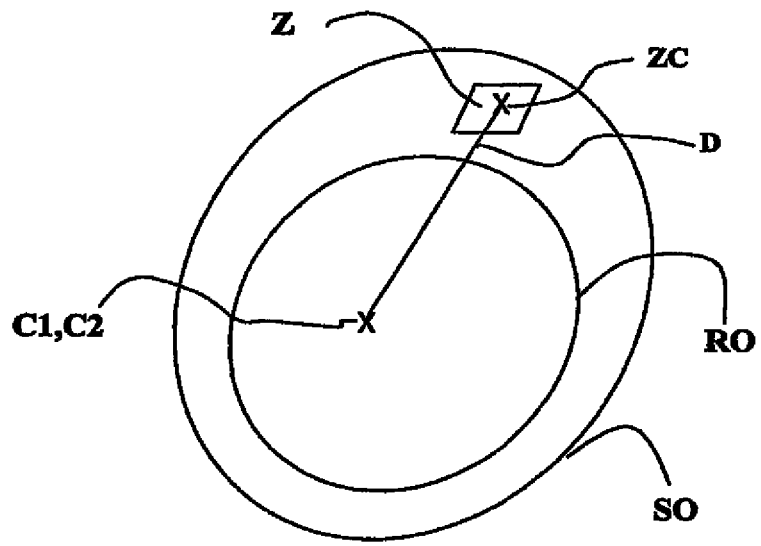
FIG. 2 illustrates the determination of the distance variation of a given part of the object wall between two instants.

The quantitative estimation of regional cardiac deformation has important clinical implications for the assessment of the function of the cardiac muscle and the assessment of the viability of cardiac muscle cells. This deformation is a complex spatio-temporal phenomenon. Contraction/relaxation phases are complicated by a twist effect, and all the regions of the muscle do not necessary contract or relax at the same time. Hence, a good spatial resolution is required when studying the contraction or the relaxation. Moreover, not only the amplitude of the contraction should be studied, but also the phase, which indicates locally the time when contraction/relaxation happens, and the way it is propagating. Several cardiopathologies are due to arrhythmias or have for consequence to disturb the heart kinetics, such as myocardial infarction, ischaemia, tachycardia and atrial or ventricular fibrillation. Nuclear imaging provides information of the cardiac contraction/relaxation. This technique shows several problems: the spatial and temporal resolutions are very poor, and the technique is carried out by an irradiating exam. Moreover, the analysis relies on the hypothesis that the cardiac contraction/relaxation is a periodic sinusoidal-like motion. Another technique using ultrasound imaging is much more precise than nuclear imaging and is not irradiating. A method called "Color Kinesis" is available, but it is limited to 2D images.

Now, 3D ultrasound systems allow the acquisition of 3D cardiac time sequences, which can be used in cardiology, in order to analyze the contraction and the relaxation of the myocardium. The heart wall motion has to be computed first, for instance by extracting the contour of the endocardium in each image of a sequence recorded during the cardiac cycle. Then, the distance between two successive contours, or the distance relative to a reference contour has to be estimated. The resulting measures may be color-coded and displayed as colored regions of the extracted heart wall in a sequence of images over a cardiac cycle. Now, the colors of each region change continuously in the sequence over the period of time, so that the physician has some difficulty to follow up the measures. Hence, the problem consists in transforming the complex and various results of this analysis into a precise, compact and complete representation, useful for the physician.

Hereafter, the object under study is the heart left ventricle and the object of interest is the internal boundary of the left ventricle wall. According to the invention, a new way of representing the deformation of the heart muscle during a cardiac cycle is proposed, the information being derived from 3D-ultrasound imaging. The acquisition system can be reconstructed 3D echocardiography system or real-time 3D echocardiography system. The problem of computation and analysis of the amplitude of the cardiac wall motion is first solved: the amplitude can be computed from a sequence of 3D simplified models of the left ventricular volume, obtained from the segmentation of 3D ultrasound images of the heart.

Then, the bull's eye technique, which is described in the AHA publication in reference, is used for displaying the results. The bull's eye is a simplified representation of a planar projection of the left ventricle, with defined regions that correspond to precise left ventricular wall regions, called segments. Hence, the classical bull's eye is only a representation of the locations of the different regions of the heart wall. An indication of a value (or a color) corresponding to the information measured for a given wall region is associated to a corresponding given region of the bull's eye.

According to the invention, a first bull's eye representation gives the information of the amplitude of the maximal (or minimal) displacement of each region during the cardiac cycle. The values of maximal (or minimal) amplitude of motion are preferably color-coded. This first bull's eye representation does not allow to distinguishing two regions having the same maximal amplitude of motion, but at different times, which may occur in the cases of post-systolic shortening or asynchronism in the cardiac insufficiency. That is why, according to the invention, two bull's eye representations are preferably displayed simultaneously in a same image of a display system: the first one represents the information of maximal (or minimal) amplitude of displacement of the heart wall regions and the second one shows the information of the instant of time, in the cardiac cycle, when this maximal (or minimal) displacement occurs in said heart wall regions. The values of the instants of time are preferably color-coded.

The system of the invention can process and display sequences of 3-D images of other parts of the heart or other organs, which can be formed by ultrasound systems or by other systems known of those skilled in the art. Generally this system can process and display sequences of 3D images of any object under study having wall motions. The wall of the object under study is called object of interest. The wall has one or several regions submitted to motions. In these cases, when the object under study is other than the heart, the regions of the wall are first segmented or extracted, and their maximal or minimal amplitudes of motion are determined. Then, two 2D schematic representations of the object wall are constructed and the corresponding regions of the segmented wall are reported on the two 2D schematic representations, which are further displayed in one image comprising a first schematic 2D representation of said wall region(s), each region baring the information of its maximal or minimal amplitude of displacement, over a time period; and a second similar schematic 2D representation of said region(s) baring the information of the instant of the time period, when this maximal or minimal displacement occurs. The 2D representations can have the shape of the bull's eyes used for the heart wall representation. Only the number of rings and of their regions may differ. The information may be color-coded in both representations.

In the following example, the object of interest is the internal boundary of the left ventricle wall. The present image processing system has processing means and display means for performing operations comprising:

1) Acquisition of a Sequence of 3-D Images of the Object Under Study.

In the present example, a sequence of 3-D images of the heart left ventricle is acquired over a cardiac cycle, using an ultrasound examination apparatus. FIG. 1B represents one image of such a sequence.

2) Segmentation of the 3-D Images of the Sequence.

The image data of the sequence are further processed to determine the wall of the heart left ventricle by a segmentation technique. Any technique of segmentation, which is able to segment the 3-D images of the sequence, may be used. The result of the segmentation operation permits of locating the voxels of wall of the heart left ventricle.

Referring to FIG. 1A, preferably, the segmentation technique of "Simplex Mesh" is used because it is robust and gives excellent results. This Simplex Mesh Technique is described in a publication by H. Delingette entitled "Simplex Meshes: a General Representation for 3D shape Reconstruction" in the "processing of the international Conference on Computer Vision and Pattern Recognition (CVPR'94), 20-24 Jun. 1994, Seattle, USA". In this paper, a physically based approach for recovering three-dimensional objects is presented. This approach is based on the geometry of "Simplex Meshes". Elastic behavior of the meshes is modeled by local stabilizing functions controlling the mean curvature through the simplex angle extracted at each vertex (node of the mesh). Those functions are viewpoint-invariant, intrinsic and scale-sensitive. The contour on a Simplex Mesh is defined as a dosed polygonal chain consisting in neighboring vertices on the Simplex Mesh. The contour is restricted to not intersect itself. The cited publication provides a simple model for representing a given 3-D object. It defines the forces to be applied in order to reshape and adjust the model onto the 3-D object of interest.

The spherical Mesh Model illustrated by FIG. 1A is used as a "Simplex Mesh Model" to segment the internal boundary of the left ventricle wall shown in FIG. 1B. The ring represents the positioning of the spherical Mesh Model of FIG. 1A in the cavity of the left ventricle. The segmentation step consists in mapping the Simplex Mesh Model onto said wall internal boundary of the left ventricle by reshaping the spherical Mesh Model. This operation gives the segmented internal wall of the left ventricle as the wall of a simplified mesh volume. This wall of the simplified volume has faces and edges, as shown in FIG. 1D relating to an instant of the sequence corresponding to the marker of the ECG curve of FIG. 1C. This segmentation operation is performed for each image of the sequence of images of the heart left ventricle, for example over a time period of a cardiac pulse, so that a sequence of segmented 3-D simplified mesh volumes whose walls represent the internal wall boundary of the left ventricle is formed. The internal wall boundary is further called "wall" for simplicity.

3) Estimation of the Displacement of the Wall Between Two Images of the Sequence.

Now, an image of the sequence of the 3D segmented wall of the heart left ventricle is chosen as reference. The other 3D images of the sequence, where the segmented wall of the left ventricle varies in shape and dimension over a cardiac cycle are further considered one by one.

Referring to FIG. 2, the segmented wall of the image of reference is denoted by RO, and called Object of Reference. The second image in time of the segmented sequence is compared with respect to this first segmented image. The image of reference is processed in order to transform the 3-D segmented Object of Reference into a binary 3-D Object of Reference. It is however still denoted by RO for simplicity. For instance, the voxels inside the 3-D Object of Reference are attributed the value 1, the voxels outside the 3-D object of reference are attributed the value 0. The boundary of the 3-D object is located between the 0 and 1 regions and represents the location of the segmented wall. Other possibility for attributing a boundary to a binary object may be used as known of those skilled in the art. The 3-D object of reference RO in the first image of the segmented sequence is now a binary 3-D object of reference. The wall of the heart left ventricle is a 3D simplified volume denoted by SO in the second image of the segmented sequence. When the wall has been segmented using the Simplex Mesh model, the simplified volume has faces denoted by Z. The center of gravity, denoted by ZC, is considered in one face Z. The center of gravity C1 of the binary 3-D Object of Reference RO of the first image and the center of gravity C2 of the 3-D simplified volume SO of the second image are also considered.

Referring to FIG. 2, in an example, the centers of gravity of the 3-D Object of Reference RO and of the simplified volume SO may be found to be located in coincidence or not in said two images. If they are not located in coincidence, an operation of translation may be performed to superimpose those points C1, C2. The displacement of the wall at the location of the voxel of the center ZC of the face can be defined as the distance denoted by D between the boundary of the binary 3-D Object of Reference RO of the first image and the center ZC of the face of the 3-D simplified volume of the second image measured along a line joining the center ZC of the face to the common center of gravity C1, C2 of the first and second 3-D objects RO, SO.

Other numerous different definitions of said distance D are possible. When the image sequence of 3-D objects under study is not segmented using the Simplex Mesh technique, however, the segmentation operation gives a sequence of simplified volumes. Zones Z can be delimited on the segmented second 3-D simplified volume SO and the same methods as above-described can be applied to one zone instead of on one face. In another possible method of segmentation, only the voxels of the segmented object under study are located for supplying a sequence of simplified volumes. In that last case, a first binary Object is computed from the first simplified volume and the distance D is defined between the boundaries of the binary Object and the second simplified volume. Then, the operations are repeated between the first binary 3-D Object RO and the second 3-D simplified volume SO for all the faces or all the zones or for boundary voxels or for voxels of wall parts as above-described in order to determine the amplitude D of the displacement between segmented images. The operations are also performed between the other images of the sequence in order to determine the amplitude of displacements of the wall faces or zones between the images of the segmented sequence. The results permit of constructing a sequence of the simplified volumes, with faces or zones showing a color-coded indication of the amplitude of displacement at each instant. Hereafter this sequence is called 3D sequence of the simplified volumes with indication of the amplitudes of displacement of wall zones or simply "3D sequence of amplitudes of displacement".

5) Definition of Regions of Interest of the Wall.

According to the invention it is proposed to construct a 2D simplified representation giving the information of the amplitudes of the maximal (or minimal) displacements of regions of the wall during the cardiac cycle, instead of or associated to the above-described 3D sequence of amplitudes of displacement.

First, Regions of Interest are defined on the wall of the segmented left ventricle, denoted by SLV, for instance as described in relation to FIG. 4 of the AHA publication or according to the desire of the medical practitioner. The AHA publication defines a vertical axis for the left ventricle and three superposed rings, each having several Regions of Interest for the medical practitioner. The cited Regions of Interest are seventeen.

6) Constructing an Amplitude Bull's Eye Representation of the Regions of Interest.

Figure 3:
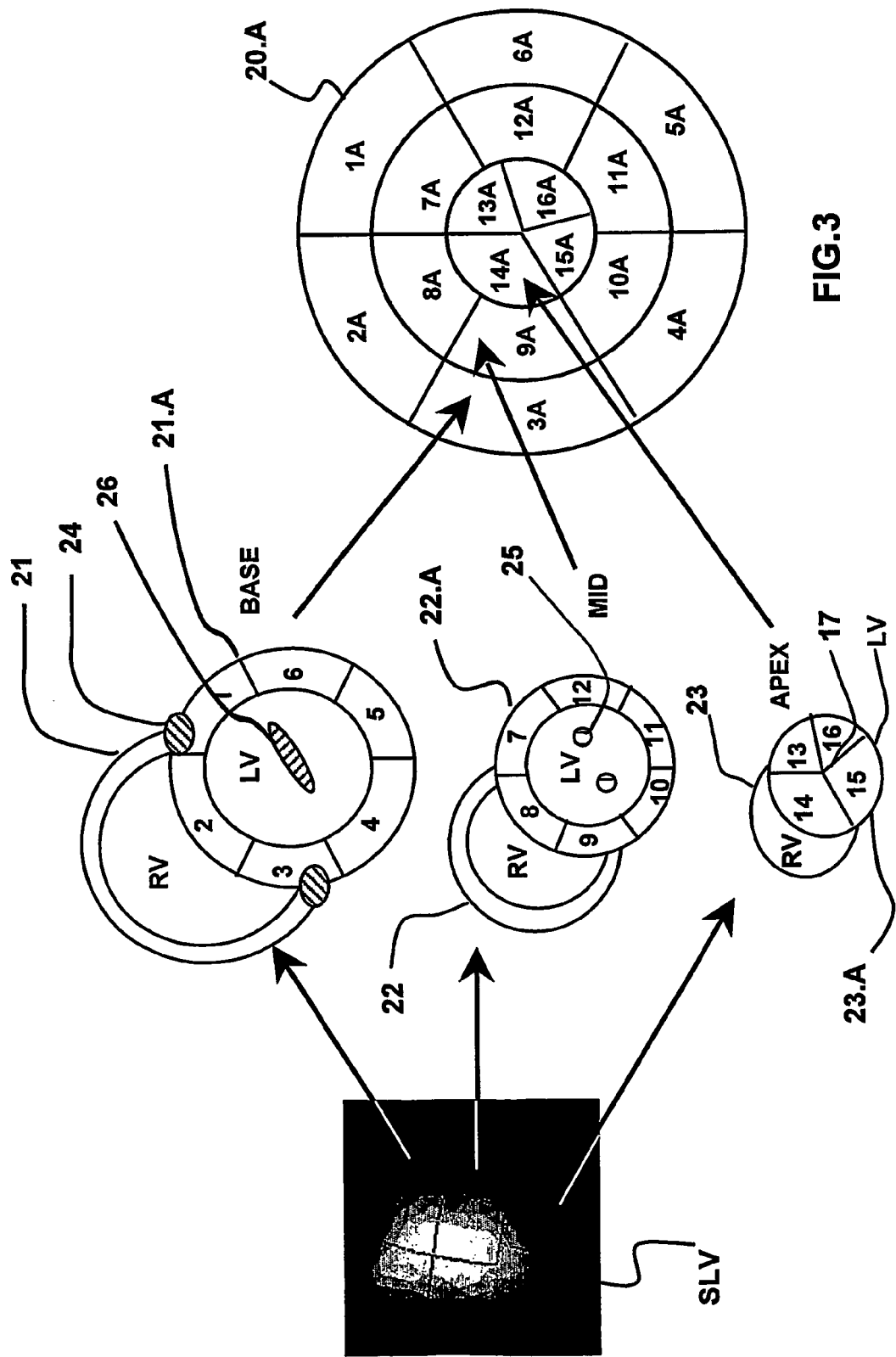
FIG. 3 is a chard representing on the left a correspondence setting between wall regions of a segmented left ventricle and wall regions of three schematic cross-sections of the left ventricle; and representing on the right a correspondence setting between said regions of the three cross-sections and regions of three rings of a bull's eye representation.

FIG. 3 is a chard that represents on the left a correspondence setting between the three rings of Regions of Interest of the wall of the segmented left ventricle SLV and three schematic cross-sections of the left ventricle where said Regions of Interest are reported. These cross-sections are shaped like rings. The upper ring is denoted by BASE and comprises segments 1 to 6 corresponding to the upper Regions of Interest of the segmented left ventricle SLV. The upper ring also comprises two points 24 of insertion of the right ventricle RV to the left ventricle LV, and a valve point 26. The middle ring is denoted by MID and comprises segments 7 to 12 corresponding to the middle regions of the segmented left ventricle SLV. The middle ring also comprises two valve points 25. The lower ring is denoted by APEX and comprises segments 13 to 16 corresponding to the lower regions of the segmented left ventricle SLV. The lower ring also comprises a point 17 for the apex. The chard of FIG. 3 also represents on the right a correspondence setting between said segments of the three rings and segments of three rings of a bull's eye representation. This bull's eye representation 20.A, which is a 2D representation of the locations of the different regions of the wall, is constructed as described in the AHA publication in reference. The three valve points are used to estimate the location of the BASE plane. The apex point is used to estimate the distance to the BASE, and thus to estimate the location of the MID plane. The insertion points are used to define the start of segment 1 of the BASE and segment 7 of MID.

The system of the invention has processing and display means that use this bull's eye representation 20.A for displaying the information of the amplitudes of the maximal (or minimal) displacements of the previously defined Regions of Interest of the wall during the cardiac cycle. The information of the amplitudes of the maximal (or minimal) displacements of said Regions of Interest is computed from the data of the "3D sequence of amplitudes of displacement". This operation can includes the computation of the amplitudes of the maximal (or minimal) displacements for each face or zone of the simplified volume, and then the averaging of found amplitude values for determining the amplitudes of the maximal (or minimal) displacements for each Region of Interest. The indications of said amplitude values corresponding to the information computed for Regions of Interest are associated to corresponding segments 1A to 16A of the bull's eye representation 20.A. The segments of this bull's eye representation 20.A give the information of the amplitudes of maximal (or minimal) displacements of the Regions of Interest during the cardiac cycle. The values of maximal amplitude of motion are preferably color-coded.

7) Constructing a Phase Bull's Eye Representation of the Regions of Interest.

However, this first bull's eye representation 20.A does not allow to distinguishing two regions having the same maximal (or minimal) amplitude of motion, but at different times, which may occur in the cases of post-systolic shortening or asynchronism in the cardiac insufficiency. That is the reason why, the system of the invention preferably has means to display two bull's eye representations 20.A and 20.B simultaneously in a same image, as illustrated by FIG. 4B. This image comprises:

the first bull's eye representation 20A, which displays the information of maximal (or minimal) amplitudes of displacement of the wall Regions of Interest 1 to 17; the values of the amplitudes are preferably color-coded. This first bull's eye is called amplitude bull's eye representation, and a second bull's eye representation 20.B, which displays the information of the instant of time, in the cardiac cycle, when a given maximal (or minimal) displacement occurs in a wall Regions of Interest; the segments are numbered 1B to 16B and correspond exactly to the segments 1A to 16A of the bull's eye representation 20.A; the values of the instants of time are preferably color-coded. This second bull's eye is called phase bull's eye representation.

8) Displaying the Bull's Eye Representations.

Figure 4A:
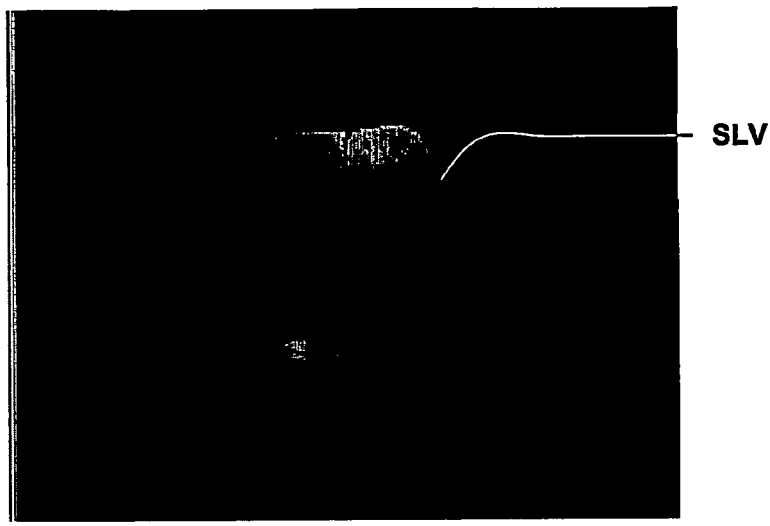
FIG. 4A is an image of a segmented left ventricle (represented in different shades of black and white in place of colors), at an instant of a color-coded image sequence.
Figure 4B:
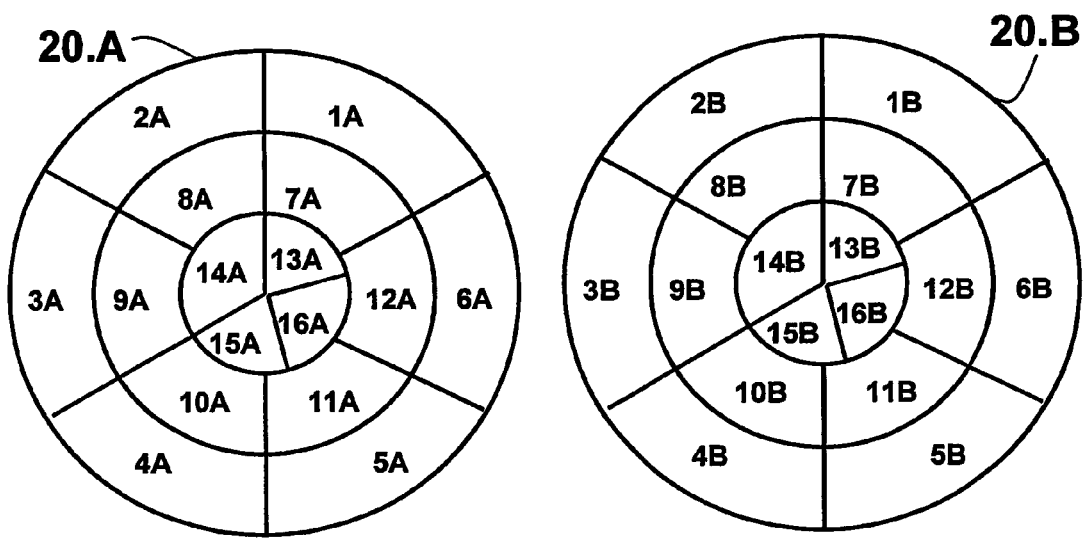
FIG. 4B is a double bull's eye representation of the heart left ventricle that is displayed according to the invention.
Figure 4C:
FIG. 4C is an ECG with a marker indicating the instant of FIG. 4A.

Referring to FIGS. 4A, 4B and 4C, the system of the invention has means for displaying the amplitude bull's eye 20.A in an image in order to provide the amplitudes of maximal (or minimal) displacement of the Regions of Interest. Preferably the phase bull's eye 20.B is displayed in the same image to give the instant of time, in the cardiac cycle, when a given maximal (or minimal) displacement occurs in a Region of Interest.

It may be also interesting for the practitioner to dispose of the "3D sequence of amplitudes of displacement". Such a sequence is represented on FIG. 4A together with the ECG curve of FIG. 4C for giving the instant of the sequence. This sequence is an animated simplified Mesh Volume whose faces display the information of their displacements. (FIG. 4A represent the color coded simplified Mesh Volume in shades of coded gray scale). The system of the invention may have processing means and display means to display all these representations in the same image.

The system of the invention may have processing means to construct an animated bull's eye representation. For this representation, the displacement amplitude values corresponding to the faces or zones of the "3D sequence of amplitudes of displacement" are averaged for determining the means displacement amplitude values to attribute to the segments of the bull's eye. The amplitudes are preferably color-coded. The indications of amplitudes of displacement, or the color coded amplitudes, of the region(s) of interest of the 3D segmented object wall are displayed in the respective projection(s) of the region(s) of interest, called segments, in one constructed 2D simplified representation, preferably one bull's eye representation. The indications (colors) corresponding to the amplitudes of displacement change in the segments at the rate of the images of the sequence, so that the 2D simplified representation is animated in function of time. Then this animated bull's eye representation is displayed together with an ECG curve. This bull's eye is called "animated bull's eye of amplitudes of displacement". This animated bull's eye may be displayed with other representations according to the choice of the practitioner.

The system of the invention has means to display the color-coded representations on a screen. This system can have further means for these representations to be stored, recorded or memorized. This permits a doctor of estimating the presence or absence of pathology related to the organ whose walls have moved or changed shape along a period of time during which the representation(s) has (have) been acquired. Preferably a color-coded scale is associated to the time bull's eye and is displayed together with a color-coded scale associated to the amplitude bull's eye.

Figure 5:
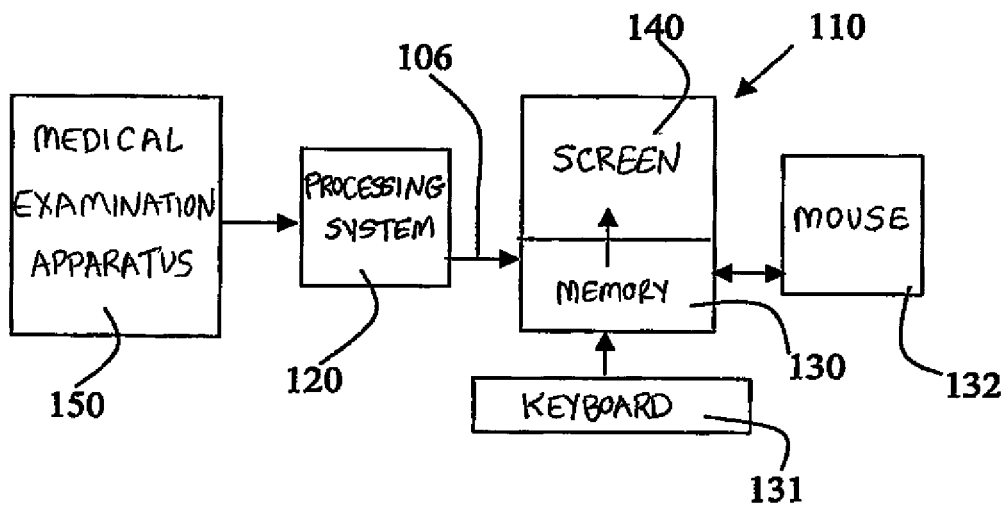
FIG. 5 shows a diagram of an examination apparatus with an image processing system.

Referring to FIG. 5, a medical examination apparatus 150 comprises means for acquiring a digital image sequence, and is associated to a digital processing system 120 for processing these data as above-described. The medical examination apparatus comprises means for providing image data to the processing system 120, which has at least one output 106 to provide image data to display and/or storage means 130, 140. The display and storage means may respectively be the screen 140 and the memory 130 of a workstation 110. Said storage means may be alternately external storage means. This image processing system 120 may be a suitably programmed computer of the workstation 110, or a special purpose processor having circuit means such as LUTs, Memories, Filters, Logic Operators, that are arranged to perform the functions of the method steps according to the invention. The workstation 110 may also comprise a keyboard 131 and a mouse 132.

This medical examination apparatus 150 may be a standard ultrasonic apparatus.

The processing system 120 may use a computer program product having program instructions to be executed by the computing means of said processing system in order to carry out the above-described processing steps or method steps.

The invention claimed is:

1. An image processing system for displaying information relating to the amplitude of displacements of wall regions of a deformable 3D object under study, the system comprising:
   acquisition means for acquiring image data of an image sequence of an organ 3D under study;
   processing means for:
      segmenting the 3D organ in the images of the sequence for locating a 3D object wall, defining regions of interest on the segmented 3D organ, and processing the image data to determine an amplitude of displacement of each of said regions of interest as a function of time; and
      constructing a first 2D simplified representation of the 3D segmented organ wall by projection of the 3D segmented organ wall along an axis, comprising the projections of the regions of interest in said 2D simplified representation; and
      constructing a second 2D simplified representation of the 3D segmented organ wall, similar to the first 2D simplified representation of the 3D segmented organ wall, and with similar projections of the regions of interest, called segments, the second 2D simplified representation being called 2D simplified phase representation; and
   display means for:
      displaying indications of the amplitudes of displacement of the regions of interest of the 3D segmented organ wall in the respective projections of said regions of interest, called segments, in said constructed 2D simplified representation, in a color coded manner;
      displaying indications of maximal or minimal amplitudes of displacement of each of the regions of interest, over a period of time, the first 2D simplified representation being called 2D simplified amplitude representation;
      displaying indications of instants of time at which the maximum or minimum of amplitudes of displacements occur in the regions of interest, over said period of time, in said 2D simplified phase representation; and
      display the 2D simplified amplitude representation and the 2D simplified phase representation together in a same image.

2. The image processing system of claim 1, wherein the means for constructing this first 2D simplified representation provides the indications of amplitudes that are indications of the maximal or minimal amplitudes of displacements of the regions of interest over the period of time.

3. The image processing system of claim 1, comprising means to display values of amplitude and of time in the respective 2D simplified amplitude representation and the 2D simplified phase representation indicated in a color-coded manner.

4. The system of claim 1, wherein the indications of the amplitudes of displacement change in the segments at a rate of the images of the sequence, so as to form an animated 2D simplified representation as a function of time.

5. The image processing system of claim 1, comprising means to display the 2D simplified representations of the 3-D object wall as 2D bull's eye representations.

6. The image processing system of claim 1, wherein the object under study is the heart left ventricle and the regions of interest include the internal boundary of the left ventricle wall.

7. The image processing system of claim 1, wherein the segmenting includes using a mesh model technique, and reshaping the mesh model for mapping said mesh model onto the wall of the 3D object under study, so as to provide a simplified volume with the segmented organ wall.

8. A system comprising a suitably programmed computer or a special purpose processor having circuit means, which are arranged to process image data as claimed in claim 1, and having means to display the processed images.

9. An image processing method for processing ultrasound image data and for displaying an ultrasound image of a deformable 3-D organ with indications of organ wall motions, wherein the method is performed by an image processing system, comprising steps of:
   acquiring image data of an image sequence of an organ under study, segmenting the 3-D organ in images of the sequence for locating a 3D object wall, defining regions of interest on the segmented 3D organ wall, and processing the image data to determine an amplitude of displacement of each of said regions of interest as a function of time;
   constructing a first 2D simplified representation of the 3D segmented organ wall by projection of the 3D segmented organ wall along an axis, comprising the projections of the regions of interest in said 2D simplified representation;
   displaying indications of the amplitudes of displacement of the regions of interest of the 3D segmented organ wall in the respective projections of the regions of interest, called segments, in said constructed 2D simplified representation, in a color coded manner;
   displaying indications of maximal or minimal amplitudes of displacement of each of the regions of interest, over a period of time, the first 2D simplified representation being called 2D simplified amplitude representation;
   constructing a second 2D simplified representation of the 3D segmented organ wall, similar to the first 2D simplified representation of the 3D segmented organ wall, and with similar projections of the regions of interest, called segments, the second 2D simplified representation being called 2D simplified phase representation;
   displaying indications of instants of time at which the maximum or minimum of amplitudes of displacements occur in the regions of interest, over the period of time, in said 2D simplified phase representation; and
   displaying the 2D simplified amplitude representation and the 2D simplified phase representation in a same image at a same time.

10. The method of claim 9, wherein displaying the indications of the amplitudes of displacement of the regions of interest, and displaying the indications of the instants of time at which the maximum or minimum of amplitudes of displacements occur in the regions of interest in the respective 2D simplified amplitude representation and the 2D simplified phase representation comprises displaying values of the amplitudes and of the instants in time in a color-coded manner.

11. The method of claim 9, wherein the indications of the amplitudes of displacement change in the segments at a rate of the images of the sequence, so as to form an animated 2D simplified representation as a function of time.

12. The method of claim 9, further comprising:
displaying the 2D simplified representations of the 3-D object wall as 2D bull's eye representations.

13. The method of claim 9, wherein the object under study is the heart left ventricle and the regions of interest include the internal boundary of the left ventricle wall.

14. The method of claim 9, wherein the segmenting includes using a mesh model technique, and reshaping the mesh model for mapping said mesh model onto the wall of the 3D object under study, so as to provide a simplified volume with the segmented organ wall.

15. A non-transitory computer-readable storage medium, comprising computer executable instructions for processing ultrasound image data and for displaying an ultrasound image of a deformable 3D organ with indications of the organ wall motions, the computer executable instructions causing an image processing device to:
acquire image data of an image sequence of an organ under study;
segment the 3D organ in the images of the sequence for locating the 3D object wall;
define regions of interest on the segmented 3D organ wall; and process the image data to determine an amplitude of displacement of each of said regions of interest as a function of time;
construct a first 2D simplified representation of the 3D segmented organ wall by projection of the 3D segmented organ wall along an axis, wherein projections of the regions of interest are part of the 2D simplified representation; and
display indications of amplitudes of displacement of the regions of interest of the 3D segmented organ wall in the respective projections of the regions of interest, called segments, in said constructed 2D simplified representation, in a color coded manner;
display indications of maximal or minimal amplitudes of displacement of each of the regions of interest, over a period of time, this first 2D simplified representation being called 2D simplified amplitude representation;
construct a second 2D simplified representation of the 3D segmented organ wall, similar to the first 2D simplified representation of the 3D segmented organ wall, and with similar projections of the regions of interest, called segments, the second 2D simplified representation being called 2D simplified phase representation;
display indications of instants of time at which the maximum or minimum of amplitudes of displacements occur in the regions of interest, over a period of time, in said 2D simplified phase representation; and
display the 2D simplified amplitude representation and the 2D simplified phase representation in a same image at a same time.

16. The non-transitory computer readable storage medium of claim 15, further comprising computer executable instructions which cause the image processing device to:
display values of amplitude and of time in the respective 2D simplified amplitude representation and the 2D simplified phase representation indicated in a color-coded manner.

17. The non-transitory computer readable storage medium of claim 15, wherein the indications of the amplitudes of displacement change in the segments at a rate of the images of the sequence, so as to form an animated 2D simplified representation as a function of time.

18. The non-transitory computer readable storage medium of claim 15, further comprising computer executable instructions which cause the image processing device to: display the 2D simplified representations of the 3-D object wall as 2D bull's eye representations.

19. The non-transitory computer readable storage medium of claim 15, wherein the object under study is the heart left ventricle and the regions of interest include the internal boundary of the left ventricle wall.

20. The non-transitory computer readable storage medium of claim 15, wherein the segmenting includes using a mesh model technique, and reshaping the mesh model for mapping said mesh model onto the wall of the 3D object under study, so as to provide a simplified volume with the segmented organ wall.

* * * * *